United States Patent [19]

Brody

[11] 4,078,455
[45] Mar. 14, 1978

[54] BROADHEAD ARROW SHARPENING ACCESSORY

[76] Inventor: John F. Brody, 1310 Jackson, Missoula, Mont. 59801

[21] Appl. No.: 784,163

[22] Filed: Apr. 4, 1977

Related U.S. Application Data

[63] Continuation-in-part of Ser. No. 702,846, Jul. 6, 1976, abandoned.

[51] Int. Cl.² .............................................. B21K 5/06
[52] U.S. Cl. .......................................... 76/88; 51/214
[58] Field of Search .................... 76/82, 82.2, 88, 86, 76/82.1, 83; 51/214, 221 BS, 285, 157, 224

[56] References Cited

U.S. PATENT DOCUMENTS

| 593,793 | 11/1897 | Vreeland | 76/36 |
|---|---|---|---|
| 1,787,478 | 1/1931 | Jackson et al. | 76/88 |
| 2,466,410 | 4/1949 | Garrison et al. | 76/82.2 |
| 2,588,089 | 3/1952 | Curtis et al. | 51/157 |
| 3,733,933 | 5/1973 | Longbrake | 76/88 |
| 3,797,334 | 3/1974 | Sinclair | 76/88 |
| 3,819,170 | 6/1974 | Longbrake | 76/88 |

*Primary Examiner*—Harold D. Whitehead
*Assistant Examiner*—Roscoe V. Parker
*Attorney, Agent, or Firm*—Wells, St. John & Roberts

[57] ABSTRACT

A broadhead arrow sharpening accessory adapted to receive a flat file between end blocks for sharpening the broadhead blades. The end blocks contain end slots formed therein for receiving the ends of the file. Parallel rods extend between the end blocks alongside the side edges of the flat file. Support carriages are slidably mounted on the rods for receiving the broadheads with a blade extending outward frictionally engaging a file surface. The carriage and broadhead are moved in unison along the rod with the blade edge frictionally engaging the filing surface to sharpen the blade edge at the desired bevel angle.

7 Claims, 10 Drawing Figures

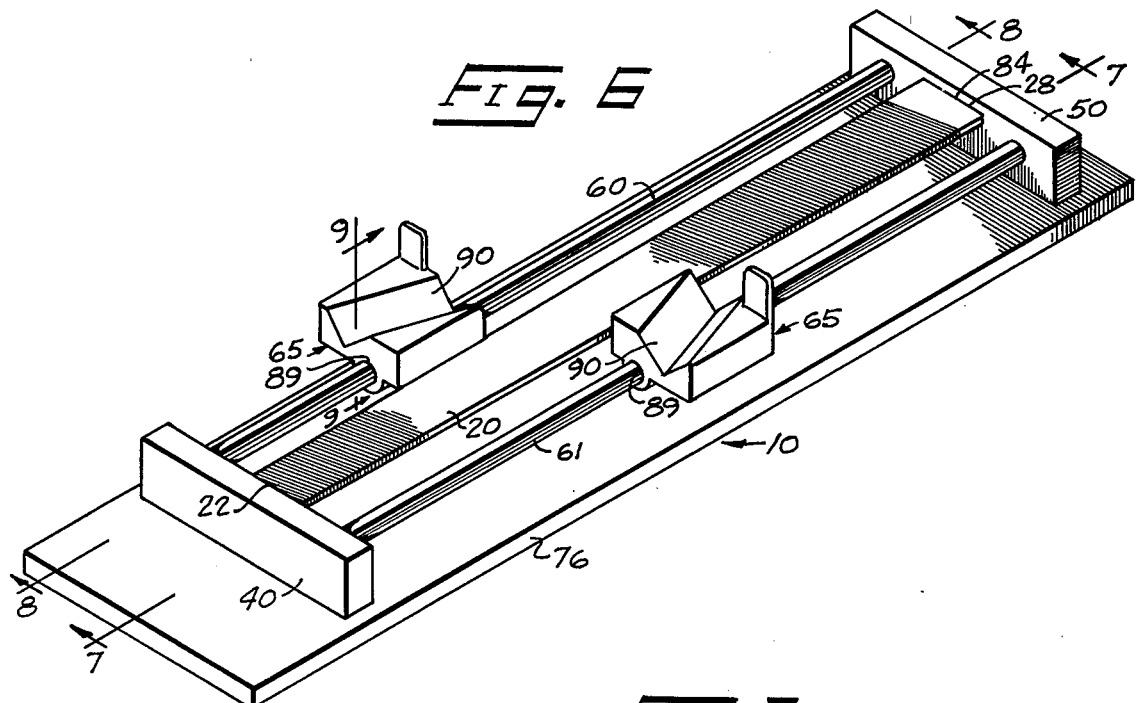
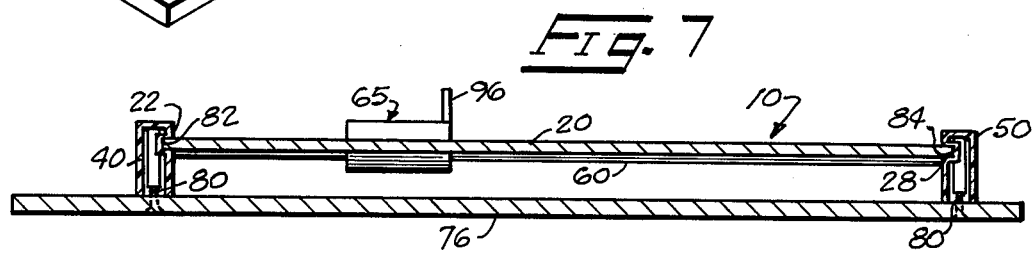
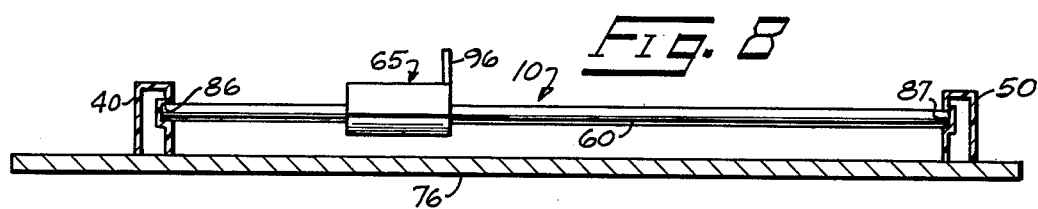
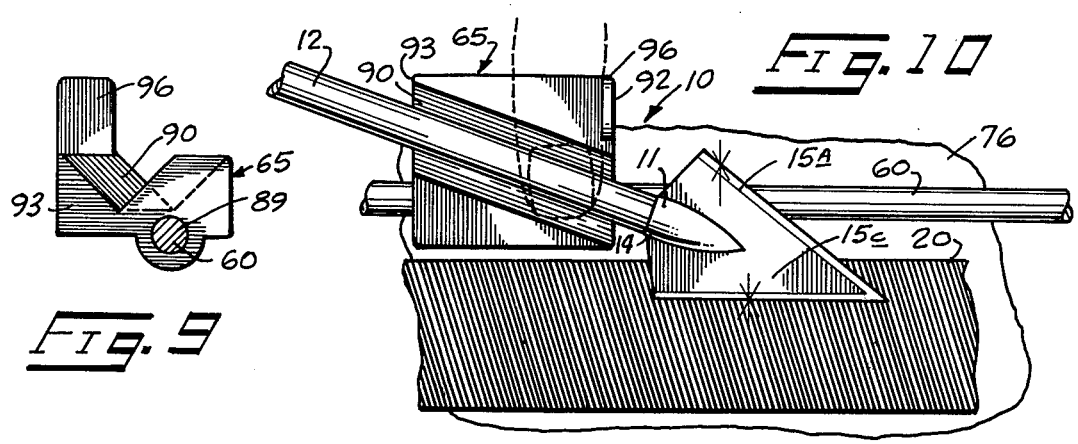

BROADHEAD ARROW SHARPENING ACCESSORY

RELATED APPLICATION

This is a continuation-in-part application based upon a parent application Ser. No. 702,846, filed July 6, 1976, now abandoned and having the same title.

BACKGROUND OF THE INVENTION

This invention relates to devices for sharpening broadhead arrows.

It is essential that archery hunters utilize broadheads having razorsharp cutting edges so that the arrow quickly penetrates the wild game, killing the game rather than wounding the game with a dull broadhead and leaving the game partially disabled.

Consequently, sincere archery hunters spend considerable numbers of hours attempting to sharpen each blade of the broadhead. Various types of sharpening devices have been devised that are razor sharp. However, such devices are either rather expensive or rather ineffective. Examples of such broadhead sharpening devices are illustrated in the following U.S. Pat. Nos.: 3,733,933, May 22, 1973, Longbrake; 3,797,334, Mar. 19, 1974, Sinclair; 3,819,170, June 25, 1974, Longbrake.

One of the principal objects of this invention is to provide a broadhead arrow sharpening accessory for enabling the archer to quickly and efficiently sharpen broadhead blades.

An additional object of this invention is to provide a new broadhead arrow sharpening accessory that enables a blade to be sharpened at a very accurate bevel on a consistent basis.

A further object of this invention is to provide a broadhead arrow sharpening accessory that enables the archer to readily sharpen both edges of each blade while minimizing the possibility of cutting himself during the sharpening operation.

An additional object of this invention is to provide a broadhead arrow sharpening accessory that is quite inexpensive to manufacture and easy to maintain and that will last a considerable time.

A further object of this invention is to provide a new broadhead arrow sharpening accessory that is adaptable to receive conventional flat files for the grinding surfaces with means for honing a desired bevel on each of the broadhead blades.

An additional object of this invention is to provide a broadhead arrow sharpening device that may be readily disassembled and carried in a very compact assemblage so that the archer can readily pack the accessory along with him during hunting trips or expeditions.

These and other objects and advantages of this invention will become apparent upon the reading of the following detailed description of a preferred embodiment.

BRIEF DESCRIPTION OF THE DRAWINGS

First and second embodiments of this invention are illustrated in the accompanying drawings, in which:

FIG. 6 is an isometric view of a second embodiment of the broadhead arrow sharpening accessory;

FIG. 7 is a fragmentary longitudinal cross-sectional view taken along line 7—7 in FIG. 6;

FIG. 8 is a fragmentary longitudinal view taken along line 8—8 in FIG. 6;

FIG. 9 is a fragmentary cross-sectional view of the support carriage taken along line 9—9 in FIG. 6;

FIG. 10 is a fragmentary plan view of a portion of the accessory showing a broadhead being sharpened.

DETAILED DESCRIPTION OF A FIRST EMBODIMENT

Figure 1:
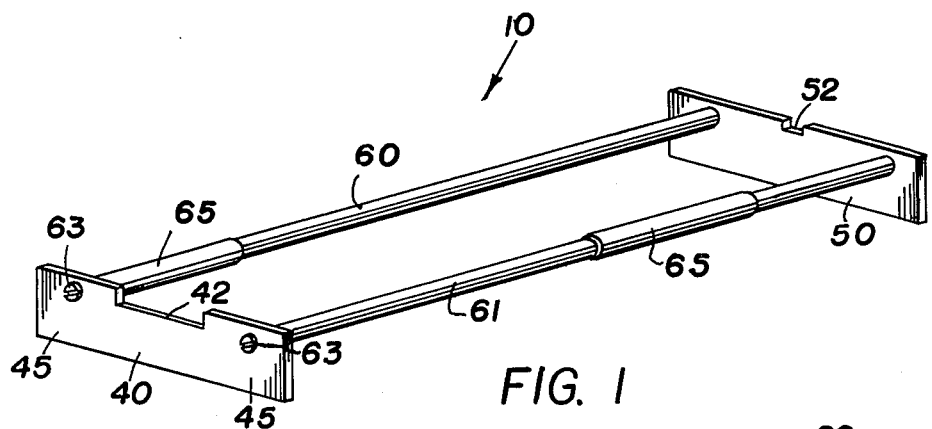
FIG. 1 is an isometric view of the broadhead arrow sharpening accessory of the first embodiment illustrating the principal features thereof.

Now referring in detail to the drawing, there is illustrated in FIG. 1 a first embodiment of a broadhead arrow sharpening accessory generally designated with the numeral 10 that incorporates the principal features of this invention. The broadhead arrow sharpening accessory 10 is designed to sharpen the blades of a broadhead 11 that is mounted on an arrow shaft 12. The broadhead 11 includes a shank portion 14 with radial blades 15 that extend radially outwardly therefrom. Generally the broadhead is made in two configurations: (1) two-blade broadhead or (2) four-blade broadhead (illustrated in FIGS. 2 and 5). The individual blades 15 are designated as 15a, b, c, and d. The broadhead 11 extends longitudinally from a base, that is affixed to the forward end of the shaft 12, to a sharp forward tip 16. Each of the blades 15a-d have peripheral beveled edges 18 intended to be sharpened by the accessory 10.

Figure 5:
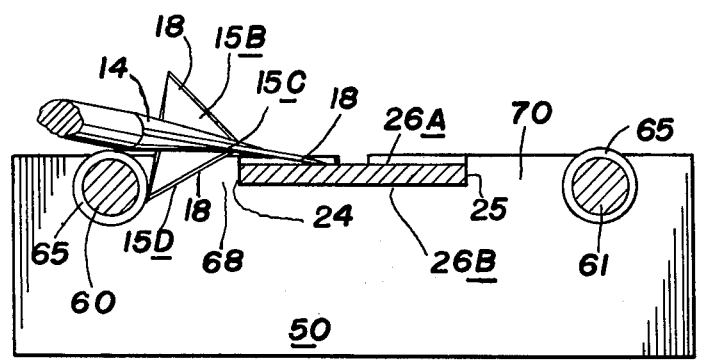
FIG. 5 is a vertical cross-sectional view taken along line 5—5 in FIG. 2.

The broadhead arrow sharpening device accessory 10 is designed to accommodate a flat file 20 thereon for use in sharpening the blades 15a-d. Preferably the file 20 is the form of a rat-tail file having a broad front end 22 with side edges 24 and 25 that extend from the broad front end 22 to a reduced or opposite end 28. The file 20 includes flat sharpening surfaces 26a and b (FIG. 5). In the first embodiment end 28 is formed in a configuration of a "tail" 30. The broad front end 22 has gradual concave curved edge surfaces 32a and 32b that extend from the tip of end 22 toward the opposite end. At the rear end 28, the edges 24 and 25 have sharp convex curved surfaces 34a and 34b that extend radially inward forming the very thin and tapered tail 30.

Figure 2:
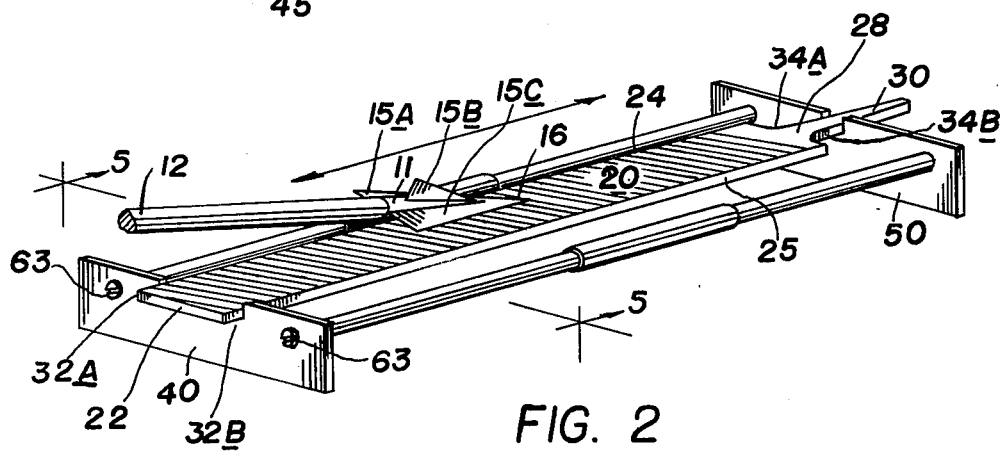
FIG. 2 is an isometric view similar to FIG. 1 except showing the accessory holding a flat file and sharpening a blade of the broadhead.
Figure 3:
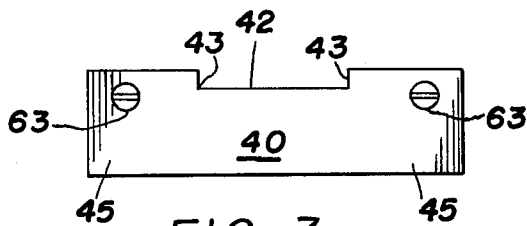
FIG. 3 is an end view of the accessory illustrated in FIG. 1.
Figure 4:
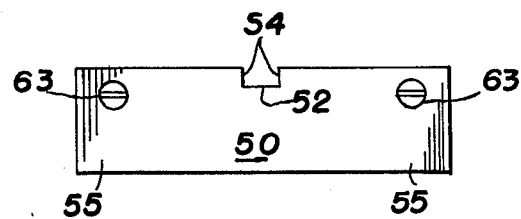
FIG. 4 is an opposite end view of the accessory illustrated in FIG. 1.

The broadhead arrow sharpening accessory 10 includes elongated transverse end blocks 40 and 50 respectively. The end block 40 has a central wide slot 42 (FIG. 3) that forms spaced shoulders 43 for receiving the broad front end 22 of the file with the shoulders 43 engaging the curved edge sections 32a and 32b as illustrated in FIG. 2. The block 40 extends outward forming wings 45. The wings 45 have apertures formed therein (not shown).

The end block 50 has a narrow slot 52 forming shoulders 54 for engaging the sharp curved edge surfaces 34a and b of the rear end of file 28. The end block 50 has wing sections 55 that extend outwardly with apertures formed therein. The end blocks 40 and 50 are designed to accommodate and support the file 20 between the front end 22 and the rear end 28 to position one of the file surfaces 26 in a desired filing or sharpening plane. Additionally the end blocks 40 and 50 prevent the file 20 from moving longitudinally during the sharpening operation.

The broadhead arrow sharpening accessory 10 further includes two parallel rods 60 and 61 that extend between the wings 45 and 55 alongside the side edges 24 and 25 of the file 20 parallel with the file surfaces 26. The ends of the rods 60 and 61 are fastened to the wings 45 and 55 respectively utilizing fastening means 63. Preferably the fastening means 63 includes screws that extend through the wings of the end blocks and into the ends of the rods 60 and 61 to secure the rods rigidly between the end blocks 40 and 50.

The broadhead arrow sharpening accessory 10 further includes support carriages 65 that are slidably mounted on the rods 60 and 61 for movement on the rods between the end blocks 40 and 50. Each of the carriages 65 illustrated in FIG. 1 has a length slightly greater than the longitudinal length of the broadhead between the base and the forward point 16 to receive the broadhead thereagainst. Each carriage 65 is designed so that when the broadhead is supported on the carriage, with one blade 15a resting on the carriage, 15c extends transversely outward and engages the file surface 26 at preset inclination to place the desired bevel on the blade edge 18. The accessory is designed to place an approximately 15 degree bevel on the blade edges of 15a and c.

Each of the rods 60 and 61 are transversely spaced from the file edges 24 and 25 to provide channels 68 and 70 respectively between the edges 24 and 25 and the rods 60 and 61. The channels 68 and 70 receive a blade 15b or d therein that is approximately 90° with respect to the blade 15c being sharpened. The channels 68 and 70 enable a four-bladed broadhead 11 to be sharpened with the 90° blade extending into the channel while the blade 15 is moved between the end blocks 40 and 50.

During the sharpening operation, the operator merely places the broadhead 11 on the accessory with the broadhead supported on one of the carriages 65 as illustrated in FIGS. 2 and 5. The blade to be sharpened extends transversely from the carriage engaging the filing surface 26. The operator then moves the carriage with the broadhead supported thereon longitudinally on the rod with the edge 18 engaging the file surface 26. With a slight pressure on the file, the broadhead is then stroked back and forth on the file until the desired sharpness is obtained. The carriage and rod provide for the proper first bevel for the blade edges. When the first side of each blade has been sharpened, then the operator merely flips the broadhead over onto the opposite carriage 65 for filing the opposite side of the blade edge. This process is repeated until all the blades have been razor sharpened. For best results, a mill-fine file 20 is recommended.

DETAILED DESCRIPTION OF SECOND EMBODIMENT

In the second embodiment illustrated in FIGS. 6–10, the broadhead arrow sharpening accessory 10 includes a base 76 on which the end blocks 40 and 50 are secured in spaced relationship. The end blocks 40 and 50 are secured to the base 76 by fastening means such as screws 80 that extend upward through the base 76 into the end blocks 40 and 50.

In the second embodiment the blocks 40 and 50 have file end cavities 82 and 84 formed therein respectively for receiving respective ends 22 and 28 of the file 20. In this embodiment, the flat file 20 need not have a tail 30.

The parallel rods 60 and 61 are likewise supported and held in rod cavities 86 and 87 respectively formed in the end blocks 40 and 50. The guide rods 60 and 61 are supported parallel with the top surface of the file 20.

In the second embodiment, each of the carriages 65 is formed of a molded body having an aperture 89 therethrough to receive the guide rod 60, 61. A V-shaped diagonal groove 90 is formed across the top surface of the body and extending between a front edge 92 and a rear edge 93. The groove 90 is preferably positioned at an angle of approximately 15° with respect to the axis of the guide rod 60, 61. At this angle, the blade edge being sharpened, is substantially parallel with the rods 60, 61. It should be noted that in this embodiment, the arrow shaft is supported within the groove 90 with the broadhead projecting forward at the desired angle to the movement of the carriage. The base of the broadhead shank 14 may bear against the front edge 92.

The carriage body has an upright abutment 96 formed thereon that extends upward to prevent the operator's finger or thumb from inadvertently slipping off the carriage and into the broadhead blades as the carriage 65 is being reciprocated on the rod 60, 61.

One can appreciate that the arrowhead sharpening accessory illustrated enables archers to accurately sharpen broadheads with the proper bevel on the broadhead edges in a very quick and efficient manner. Additionally, the device enables the operator to perform the task in a much safer method than previously provided.

It should be understood that the above described embodiment is merely illustrative of the principles of this invention and numerous other embodiments may be readily devised without deviating therefrom. Therefore, only the following claims are intended to define this invention.

What is claimed is:

1. A broadhead arrow sharpening accessory for receiving an elongated flat file by its ends and supporting the flat file with a filing surface in a desired sharpening plane to sharpen the broadhead blade edges, said accessory comprising:
    spaced end blocks having slots formed therein to receive the ends of the elongated flat file to support the elongated flat file with a flat file surface in the desired plane;
    a pair of elongated, parallel rods extending between and supported by the spaced end blocks parallel with the desired plane; and
    broadhead support carriages slidably mounted on corresponding rods for receiving a broadhead thereon with the blade edge projecting laterally outward from the shank thereof whereby the broadhead may engage the flat file surface to enable the operator to move the carriage and the broadhead along the corresponding rod with the blade edge frictionally engaging the flat file surface to sharpen the desired bevel on the blade edge.

2. The broadhead arrow sharpening accessory as defined in claim 1 wherein the rods and carriages are mounted in relation to the desired sharpening plane so that the broadhead blade edge is sharpened at a desired bevel.

3. The broadhead arrow sharpening accessory as defined in claim 1 wherein the carriage has a diagonal groove formed therein for receiving the arrow shaft at a desired acute angle with respect to the rods.

4. The broadhead arrow sharpening accessory as defined in claim 1 wherein the carriage includes an upright abutment formed thereon to prevent the operator's finger from sliding off the carriage and into the broadhead blade edges.

5. A broadhead arrow sharpening accessory for sharpening the blade edges of a broadhead supported on an arrow shaft, comprising:
   a flat file;
   spaced end blocks having slots formed therein to receive ends of the elongated flat file to support the elongated flat file with a flat file surface in a desired plane;
   a pair of elongated, parallel rods extending alongside the flat file parallel with the desired plane and supported by said end blocks; and
   broadhead support carriages slidably mounted on corresponding rods for receiving a broadhead thereon with the blade edge projecting laterally outward from the shank thereof whereby the broadhead may engage the flat file surface to enable the operator to move the carriages and the broadhead along the corresponding rod with the blade edge frictionally engaging the flat file surface to sharpen the desired bevel on the blade edge.

6. The broadhead arrow sharpening accessory as defined in claim 5 wherein the file is a flat rat-tail file having a broad forward end and a thin tapered rear end and wherein the end blocks having receiving slots formed therein that are complementary to the ends of the rat-tail file for receiving and gripping the file ends to prevent the file from being moved longitudinally during the sharpening operation.

7. The broadhead arrow sharpening accessory as defined in claim 5 wherein the broadhead has four blades and the parallel rods are sufficiently transversely spaced from the file edges to form longitudinal channels between the rods and the file to enable one of the broadhead blades to project into the channels while an adjacent blade is being sharpened.

* * * * *